(12) United States Patent
Yasuno (10) Patent No.: US 11,060,835 B2
(45) Date of Patent: Jul. 13, 2021

(54) ROTARY TABLE AND ROUNDNESS MEASURING MACHINE

(71) Applicant: MITUTOYO CORPORATION, Kawasaki (JP)

(72) Inventor: Junsuke Yasuno, Kure (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/819,799

(22) Filed: Mar. 16, 2020

(65) Prior Publication Data

US 2020/0300596 A1    Sep. 24, 2020

(30) Foreign Application Priority Data

Mar. 22, 2019   (JP) .............................. JP2019-054310

(51) Int. Cl.
*G01B 5/00* (2006.01)
*G01B 21/30* (2006.01)
*G12B 5/00* (2006.01)

(52) U.S. Cl.
CPC ........... *G01B 5/0004* (2013.01); *G01B 21/30* (2013.01); *G12B 5/00* (2013.01)

(58) Field of Classification Search
CPC ...... G01B 5/0004; G01B 21/30; G01B 5/201; G01B 21/20; G12B 5/00; B25H 1/14; B25B 11/00
USPC .................................................. 33/549, 503
See application file for complete search history.

(56) References Cited

U.S. PATENT DOCUMENTS

| 6,895,682 | B2 * | 5/2005 | Sohn | G01B 21/04 33/549 |
|---|---|---|---|---|
| 2005/0132591 | A1 * | 6/2005 | Kojima | G01B 5/08 33/503 |
| 2015/0345937 | A1 * | 12/2015 | Seitz | G01B 21/042 250/231.13 |
| 2019/0323834 | A1 * | 10/2019 | Sakai | G01B 5/201 |
| 2020/0041265 | A1 * | 2/2020 | Abe | G06K 9/00671 |
| 2020/0300596 | A1 * | 9/2020 | Yasuno | G01B 5/0004 |

FOREIGN PATENT DOCUMENTS

| JP | 2569390 | 1/1997 |
|---|---|---|
| JP | 2863070 | 3/1999 |

* cited by examiner

*Primary Examiner* — Yaritza Guadalupe-McCall
(74) *Attorney, Agent, or Firm* — Rankin, Hill & Clark LLP (57) ABSTRACT

A rotary table includes: a stage; a rotary base configured to be rotated around a rotation center axis; a support mechanism that is disposed on the rotary base and supports the stage; a leveling adjustment mechanism configured to perform a leveling adjustment of the stage; and a transfer mechanism configured to transfer a rotative force of the rotary base to the stage. The transfer mechanism includes: an annular transfer member configured to receive the support mechanism therethrough; a first connecting mechanism that connects the transfer member and the rotary base and is rotatable around the first axis; and a second connecting mechanism that connects the transfer member and the stage and is rotatable around a second axis defined in a direction intersecting the first axis.

8 Claims, 6 Drawing Sheets

ROTARY TABLE AND ROUNDNESS MEASURING MACHINE

The entire disclosure of Japanese Patent Application No. 2019-054310 filed Mar. 22, 2019 is expressly incorporated by reference herein.

TECHNICAL FIELD

The present invention relates to a rotary table and a roundness measuring machine.

BACKGROUND ART

A roundness measuring machine is a machine for measuring roundness, cylindricity, coaxiality, etc. of a measurement target (workpiece) with a rotationally symmetric shape such as a column or a cylinder. Accordingly, the roundness measuring machine measures a circumferential profile of the workpiece by placing the workpiece on a rotary table, bringing a contact piece of a displacement gauge into contact with a surface of the workpiece, and simultaneously detecting a rotation angle of the rotary table and a displacement of the contact piece while rotating the rotary table.

The roundness measuring machine includes, as a rotary table, a centripetal table equipped with a centering adjustment mechanism and a leveling adjustment mechanism (Patent Literature 1: JP 2569390 B and Patent Literature 2: JP 2863070 B).

The centripetal table includes a rotary base with a horizontal upper surface, a movable base displaceable along the upper surface of the rotary base, and a stage supported by the movable base. The stage, which is supported at a slide surface in a form of a spherical surface by the movable base, is configured to be inclined with respect to the movable base as a result of being displaced along the slide surface.

The centering adjustment mechanism, which includes two pairs of displacement mechanisms comparable to a micrometer head, is configured to perform centering adjustment of the stage by causing the movable base to slightly move in two directions (Cx direction and Cy direction orthogonal to each other) with respect to the rotary base.

The leveling adjustment mechanism, which includes two pairs of displacement mechanisms opposed to the displacement mechanisms of the centering adjustment mechanism and similar thereto, is configured to perform leveling adjustment of the stage by causing the stage to slightly move in two directions (Lx direction and Ly direction orthogonal to each other) with respect to the movable base to incline the stage supported at the spherical surface.

The roundness measuring machine of Patent Literature 1 includes, as a part of the centering adjustment mechanism and the leveling adjustment mechanism, a shaft extending upward from the rotary base and, as a part of the leveling adjustment mechanism, two pin members extending downward from the stage.

The two pairs of displacement mechanisms (Cx and Cy directions) of the centering adjustment mechanism and the two pairs of displacement mechanisms (Lx and Ly directions) of the leveling adjustment mechanism are in contact with the shaft in the four directions.

The two pin members are disposed in a portion near an outer periphery of the stage at a 90-degree interval relative to a rotation center of the stage and respectively engaged with the two pairs of displacement mechanisms (Lx and Ly directions). The leveling adjustment mechanism causes each of the pin members to be displaced to incline the stage, which is supported at the spherical surface by the movable base. At this time, since rotation cannot be transferred between the movable base and the stage through the supported spherical surface (i.e., slide surface), a rotative force from the movable base is transferred to the stage through the above pin members.

The roundness measuring machine according to Patent Literature 2 includes, as a part of the centering adjustment mechanism and the leveling adjustment mechanism, a shaft extending downward from the stage and, as a part of the leveling adjustment mechanism, two pin members extending upward from the rotary base. The shaft and the pin members of Patent Literature 2, which are vertically inverted from the pin members and the shaft of Patent Literature 1, have functions similar respectively thereto.

In the above roundness measuring machine of each of Patent Literature 1 and Patent Literature 2, the centering or leveling adjustment mechanism includes the two pin members disposed at the 90-degree interval relative to a rotation center axis of the rotary table and the rotative force of the rotary table is transferred to the stage through these pin members. For this reason, the rotative force transferred to the stage through the pin members is sometimes larger at a side of the stage where the pin members are present than at the rotation center.

If the rotative force is unevenly transferred, angular acceleration occurring in the rotary table (e.g., acceleration or deceleration of the rotary table or transmission of vibration of a drive motor) generates a radial force in the stage due to inertia force, causing deterioration in rotation accuracy.

It is possible to reduce the vibration from the drive motor by, for instance, incorporating an elastic body in a transfer path of the rotative force. However, in the roundness measuring machine required to exhibit a high accuracy in rotary positioning, it is not acceptable to incorporate the elastic body therein since the elastic body lowers a rigidity of the transfer path. Alternatively, the inertia force generated in the stage is reducible by slowing acceleration or deceleration of the rotary table. However, this is not practically acceptable in consideration of work efficiency.

In view of the above, the rotary table including the leveling adjustment mechanism has been desired to prevent unevenness of the rotative force.

SUMMARY OF THE INVENTION

An object of the invention is to provide a rotary table and a roundness measuring machine configured to achieve leveling adjustment and prevent unevenness of a rotative force.

A rotary table according to an aspect of the invention includes: a stage on which a workpiece is to be placed; a rotary base configured to be rotated around a vertical rotation center axis; a support mechanism that is disposed on the rotary base and supports the stage; a leveling adjustment mechanism configured to perform a leveling adjustment of the stage with respect to the rotary base; and a transfer mechanism configured to transfer a rotative force of the rotary base to the stage, in which the support mechanism includes a support member that is supported by the rotary base and supports a lower side of the stage at a spherical slide surface, the leveling adjustment mechanism includes: a leveling shaft that extends downward from a middle of the stage; and two pairs of leveling displacement mechanisms that are in contact with the leveling shaft, and the transfer mechanism includes: an annular transfer member configured to receive the support mechanism therethrough; a first connecting mechanism that connects the transfer member and the rotary base and is rotatable around the first axis; and a second connecting mechanism that connects the transfer member and the stage and is rotatable around a second axis, the first axis and the second axis being defined in intersecting directions.

In the above aspect of the invention, the support mechanism enables support of the stage on the rotary base, the leveling adjustment mechanism enables the leveling adjustment of the stage with respect to the rotary base, and the transfer mechanism enables transfer of a rotative force of the rotary base to the stage.

Here, since the transfer mechanism is functionally separated from the leveling adjustment mechanism to be structurally unbound by the leveling adjustment mechanism, the first connecting mechanisms and the second connecting mechanisms can be mutually equidistantly provided to the annular transfer member and be disposed symmetrically with respect to the rotation center axis of the rotary table. As a result, the rotative forces transferred from the rotary base to the stage through the first connecting mechanisms and the second connecting mechanisms can be symmetrical with respect to the rotation center axis, making it possible to achieve the leveling adjustment and prevent unevenness of the rotative forces.

Moreover, in the above aspect of the invention, since the transfer mechanism includes the annular transfer member, the support mechanism is insertable in the annular transfer member. Accordingly, even when the transfer mechanism is separated from the support mechanism or the leveling adjustment mechanism, the transfer mechanism reliably functions as the rotary table.

It is preferable that the rotary table according to the above aspect of the invention further includes: a movable base displaceable along an upper surface of the rotary base; and a centering adjustment mechanism configured to perform a centering adjustment of the movable base with respect to the rotary base, in which the support member and the leveling displacement mechanisms are supported by the movable base, the centering adjustment mechanism includes: a centering shaft extending upward from a middle of the rotary base; and two pairs of centering displacement mechanisms that are in contact with the centering shaft, the first connecting mechanism includes a portion connected to the transfer member and a portion connected to the rotary base that are displaceable along the first axis, and the second connecting mechanism includes a portion connected to the transfer member and a portion connected to the stage that are displaceable along the second axis.

In the above aspect of the invention, the movable base, the support mechanism, and the stage are horizontally displaceable with respect to the rotary base and the displacement is adjustable by the centering adjustment mechanism. In the transfer mechanism, the first connecting mechanism is displaceable along the first axis and the second connecting mechanism is displaceable along the second axis, thereby allowing horizontal displacement of the rotary base and the stage. This makes it possible to obtain a centering adjustment function by the centering adjustment mechanism in addition to the above leveling adjustment function by the leveling adjustment mechanism.

In the rotary table according to the above aspect of the invention, it is preferable that the leveling shaft and the centering shaft are each disposed coaxially with the rotation center axis and have respective end surfaces disposed to face each other.

In the above aspect of the invention, the leveling shaft is at the upper side and the centering shaft is at the lower side with reference to the pair of facing end surfaces. The four displacement mechanisms in total with the same configuration are disposed around the rotation center axis at 90-degree intervals and adjacent two of the displacement mechanisms are in contact with the leveling shaft at the upper side while the remaining two of the displacement mechanisms are in contact with the centering shaft at the lower side, thereby defining the leveling adjustment mechanism and the centering adjustment mechanism. Consequently, standardization and structural simplification of components are promotable.

In the rotary table according to the above aspect of the invention, it is preferable that the first connecting mechanism includes: a stroke bearing disposed at one of a portion connected to the transfer member and a portion connected to the rotary base; and a shaft disposed at the other one of the portion connected to the transfer member and the portion connected to the rotary base, the shaft being received in the stroke bearing.

In the above aspect of the invention, the first connecting mechanism includes the stroke bearing. Such a simple configuration allows displacement necessary for the leveling adjustment or the centering adjustment for a smooth action.

In the rotary table according to the above aspect of the invention, it is preferable that the first connecting mechanism includes: a pair of pins that are disposed at one of a portion connected to the transfer member and a portion connected to the rotary base and extend in a direction of the rotation center axis; a pair of rollers each supported on corresponding one of the pins via a stroke bearing while being rotatable and movable in the direction of the rotation center axis; and a shaft disposed at the other one of the portion connected to the transfer member and the portion connected to the rotary base and held between the pair of rollers while being longitudinally movable.

In the above aspect of the invention, the first connecting mechanism includes the shaft held between the pair of rollers. This allows displacement necessary for the leveling adjustment or the centering adjustment. Further, motion of the rollers along the pins allows displacement of the rotary table in the direction of the rotation center axis between the rotary base and the stage (partially or fully in a circumferential direction).

In the rotary table according to the above aspect of the invention, it is preferable that the second connecting mechanism includes: a stroke bearing disposed at one of a portion connected to the transfer member and a portion connected to the stage; and a shaft disposed at the other one of the portion connected to the transfer member and the portion connected to the stage and received in the stroke bearing.

In the above aspect of the invention, the second connecting mechanism includes the stroke bearing. Such a simple configuration allows displacement necessary for the leveling adjustment or the centering adjustment for a smooth action.

In the rotary table according to the above aspect of the invention, it is preferable that the second connecting mechanism includes: a pair of pins that are disposed at one of a portion connected to the transfer member and a portion connected to the stage and extend in a direction of the rotation center axis; a pair of rollers each supported on corresponding one of the pins via a stroke bearing while being rotatable and movable in the direction of the rotation center axis; and a shaft disposed at the other one of the portion connected to the transfer member and the portion connected to the stage and held between the pair of rollers while being longitudinally movable.

In the above aspect of the invention, the second connecting mechanism includes the shaft held between the pair of rollers. This allows displacement necessary for the leveling adjustment or the centering adjustment. Further, motion of the rollers along the pins allows displacement of the rotary table in the direction of the rotation center axis between the rotary base and the stage (partially or fully in a circumferential direction).

A roundness measuring machine according to another aspect of the invention includes the rotary table according to the above aspect of the invention.

In this aspect of the invention, the same effects as in the description regarding the rotary table according to the above aspect of the invention are obtainable.

According to the aspects of the invention, it is possible to provide a rotary table and a roundness measuring machine configured to achieve leveling adjustment and prevent unevenness of a rotative force.

DESCRIPTION OF EMBODIMENT(S)

Description will be made below on an exemplary embodiment of the invention with reference to attached drawings.

Figure 1:
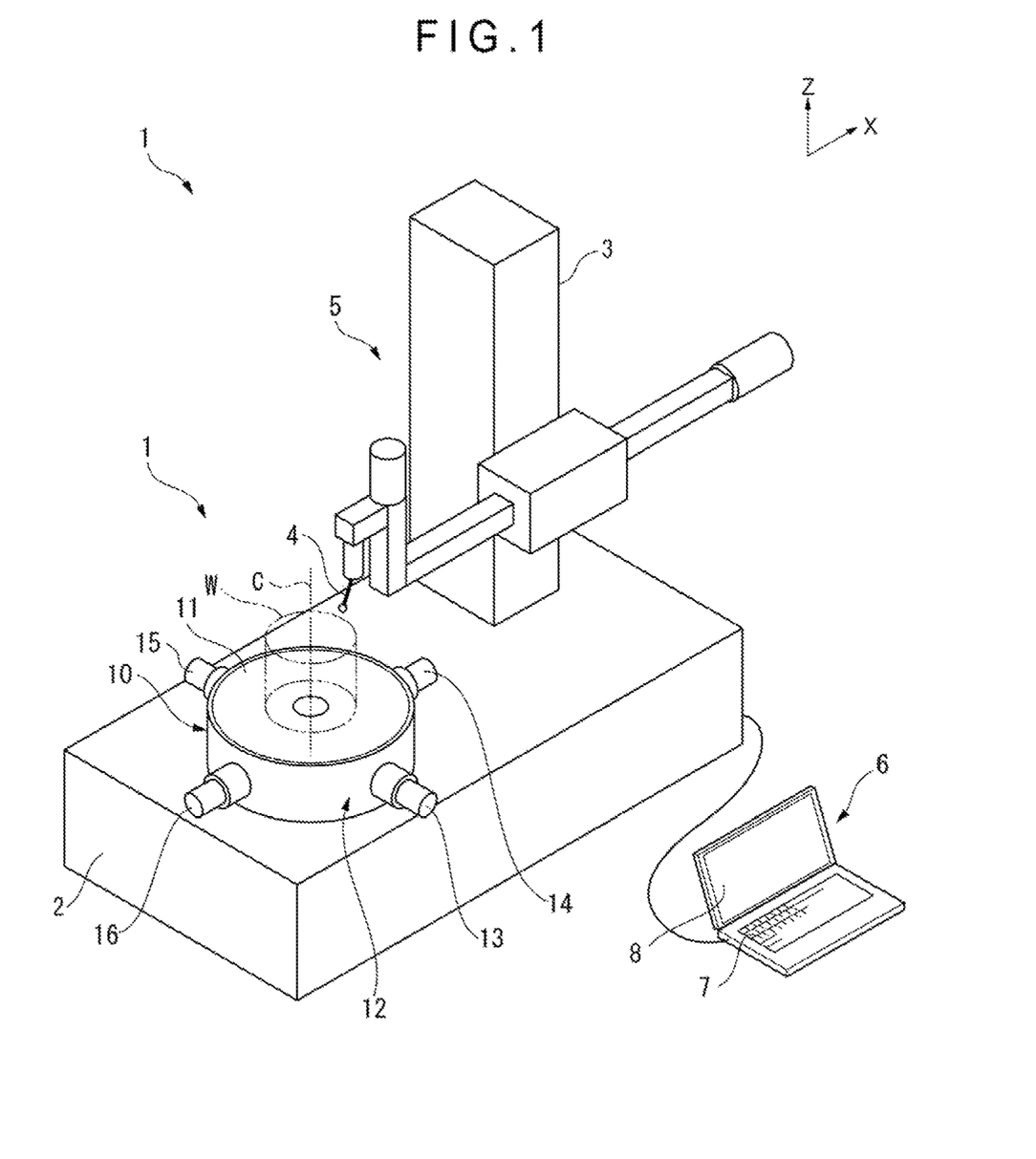
FIG. 1 is a perspective view showing a roundness measuring machine according to an exemplary embodiment of the invention.

FIG. 1 shows a roundness measuring machine 1 based on the invention.

The roundness measuring machine 1 includes a rotary table 10, where a workpiece W (measurement target) is to be placed, disposed on an upper surface of a body case 2. A column 3 is provided adjacent to the rotary table 10 on the body case 2, the column 3 supporting a probe 4. The probe 4 is configured to be moved in an X-axis direction and a Z-axis direction by a motion mechanism 5, which is provided in the column 3, and measure any surface position of a workpiece W placed on the rotary table 10.

The body case 2 is connected to a measurement controller 6.

The measurement controller 6 in a form of a computer system such as a so-called personal computer is configured to receive an operation from an operation unit 7, such as a keyboard or a pointing device, run a designated measurement program to control actions of the rotary table 10 and the motion mechanism 5, and cause display 8 to display an obtained measurement result.

The rotary table 10 has an upper surface provided with a disk-shaped stage 11 where the workpiece W is to be placed and a side surface surrounded by a cylindrical cover 12.

The cover 12 is provided with a Cx adjustment knob 13 and a Cy adjustment knob 14 for centering adjustment and an Lx adjustment knob 15 and an Ly adjustment knob 16 for leveling adjustment, all of the knobs respectively facing four directions.

The stage 11 of the rotary table 10 is supported rotatably around a rotation center axis C extending in the Z-axis direction, and is rotated by a drive motor or the like (not shown) disposed inside the body case 2.

Figure 2:
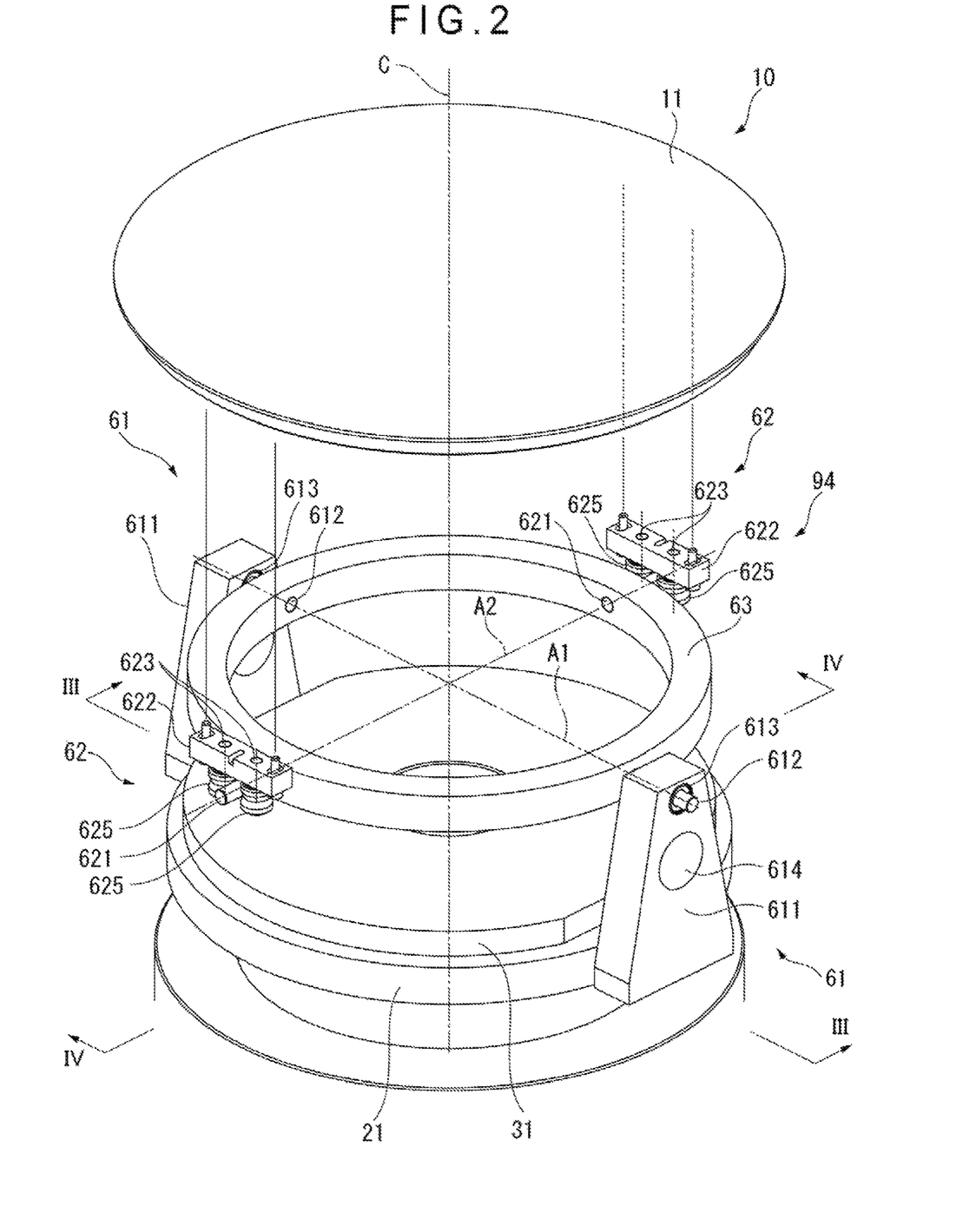
FIG. 2 is an exploded perspective view showing a rotary base, a stage, and a transfer mechanism according to the exemplary embodiment.

As shown in FIG. 2, while including the stage 11 on the upper surface, the rotary table 10 includes a rotary base 21 and a movable base 31, each of which is in a disk shape, inside the cylindrical cover 12.

Figure 3:
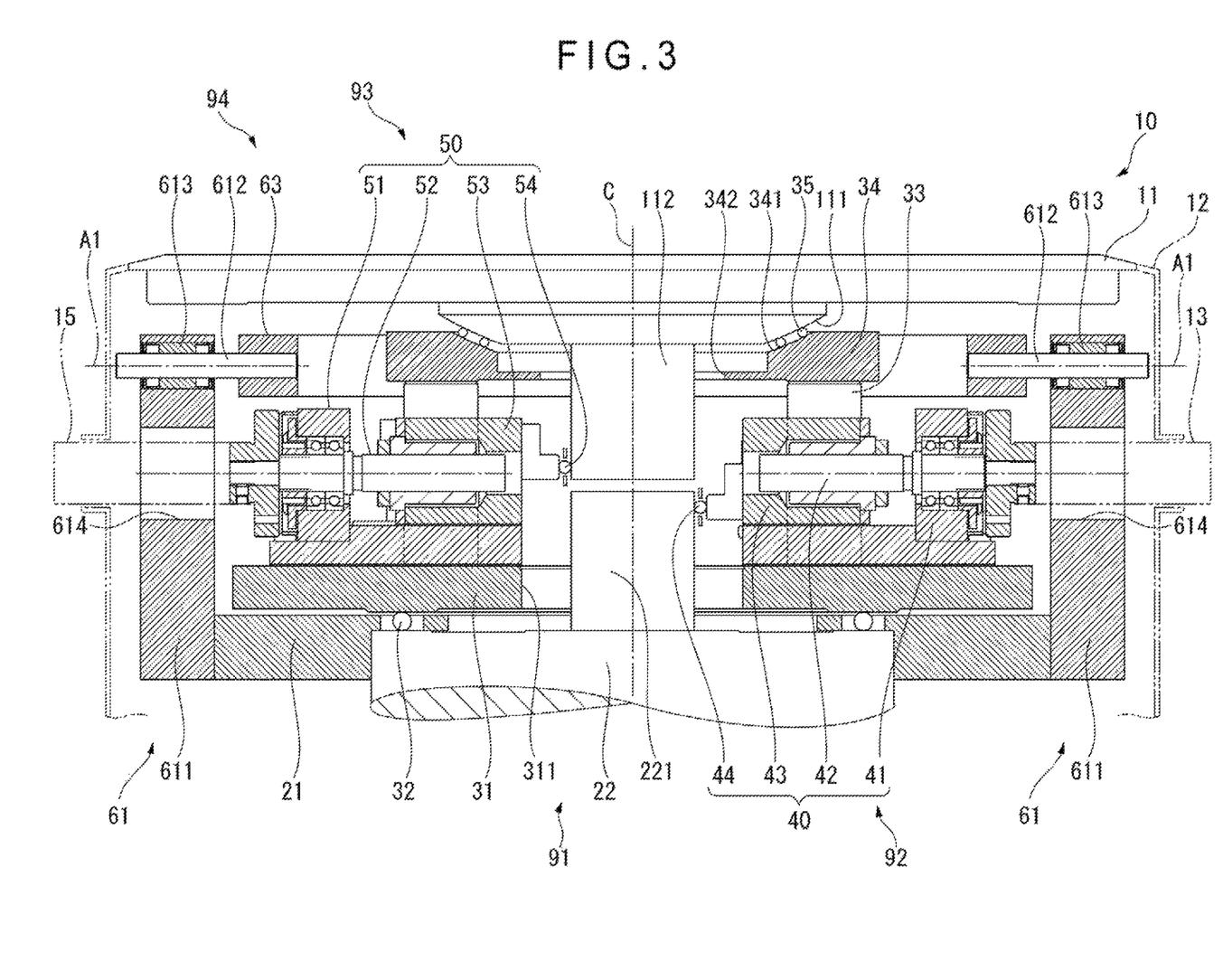
FIG. 3 is a cross-sectional view taken along a III-III line in FIG. 2, showing the rotary table according to the exemplary embodiment.
Figure 4:
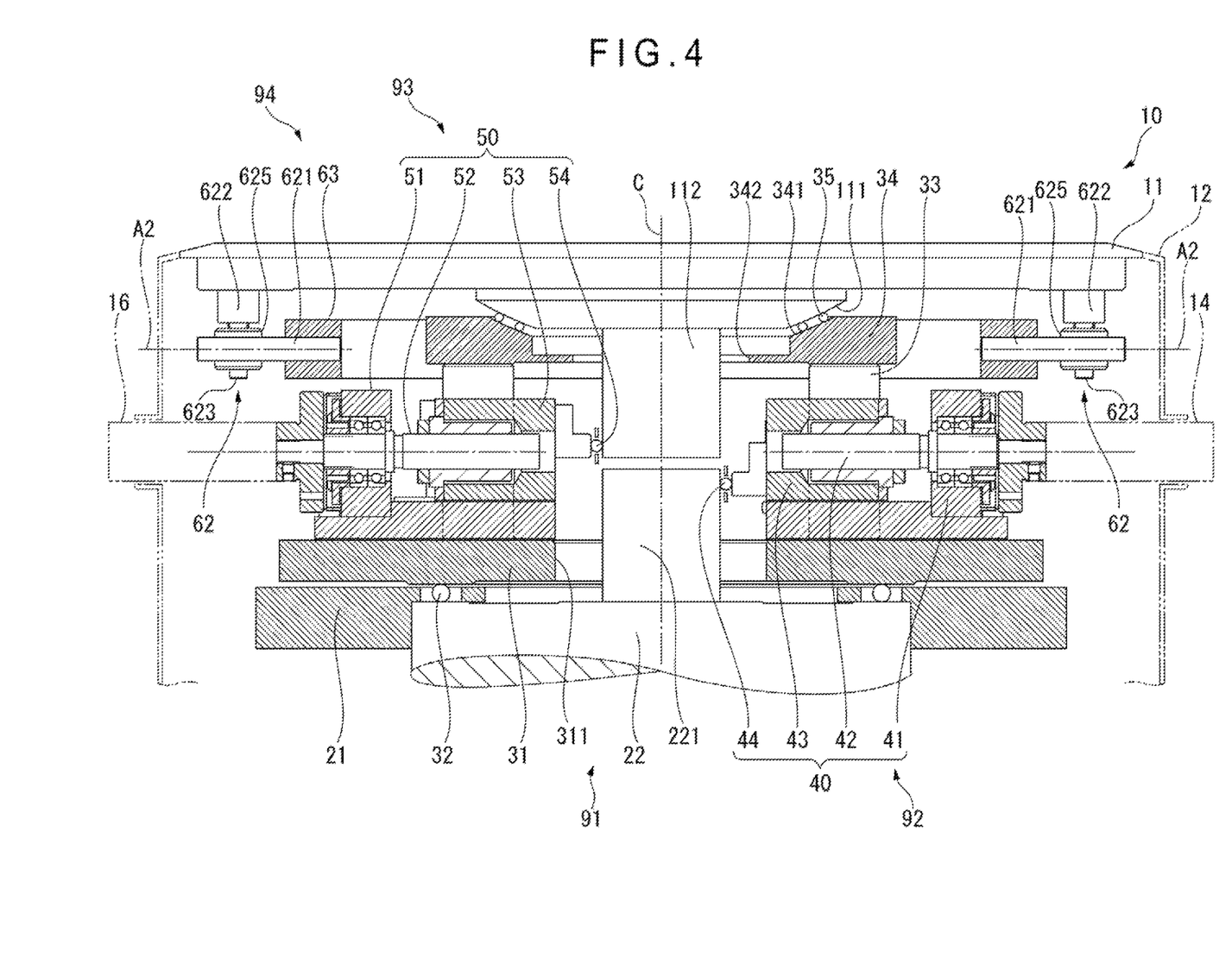
FIG. 4 is a cross-sectional view taken along a IV-IV line in FIG. 2, showing the rotary table according to the exemplary embodiment.

As shown in FIG. 3 and FIG. 4, the rotary base 21 is fixed to an upper end of a driving shaft 22 extending upward from the inside of the body case 2 along the rotation center axis C. The movable base 31 is disposed on an upper surface of the rotary base 21.

A plurality of rolling balls 32, which are circumferentially equidistant, are interposed between the movable base 31 and an upper surface of the driving shaft 22. Rolling of the rolling balls 32 makes it possible to displace the movable base 31 in any direction along the upper surface of the rotary base 21.

A support member 34 is disposed to the movable base 31 through a plurality of support columns 33, the support member 34 being above the movable base 31.

The support member 34, which has an upper surface defining a slide surface 341 in a form of a recessed spherical surface, is held at a level adjacent to a lower surface side of the stage 11. The stage 11 has a lower surface defining a slide surface 111 in a form of a protruding spherical surface.

Rolling balls 35 are interposed between the slide surface 341 of the support member 34 and the slide surface 111 of the stage 11 and are each held by a retainer (not shown). The slide surface 341 of the support member 34 and the slide surface 111 of the stage 11, which have respective centers of curvature at the same position on the rotation center axis C, are configured to roll with respect to each other via the rolling balls 35, allowing the stage 11 to be inclined with respect to a section from the support member 34 to the movable base 31 and the rotary base 21.

In the exemplary embodiment, the rolling balls 32, the movable base 31, the support columns 33, the support member 34, and the rolling balls 35 provide a support mechanism 91 according to the invention, which is disposed on the rotary base 21 to support the stage 11.

A centering shaft 221 extending upward is provided at a middle of the upper surface of the driving shaft 22. The centering shaft 221 reaches a side of an upper surface of the movable base 31 through a middle opening 311 of the movable base 31.

A leveling shaft 112 extending downward is provided at a middle of the lower surface of the stage 11. The leveling shaft 112 reaches a side of a lower surface of the support member 34 through a middle opening 342 of the support member 34.

The leveling shaft 112 and the centering shaft 221, each of which is disposed coaxially with the rotation center axis C, are the same in diameter and respective end surfaces thereof are disposed to face each other.

Two pairs of centering displacement mechanisms 40 and two pairs of leveling displacement mechanisms 50 are disposed on the upper surface of the movable base 31.

The two pairs of centering displacement mechanisms 40 are respectively disposed in directions where the Cx adjustment knob 13 and the Cy adjustment knob 14 are disposed with respect to the rotation center axis C (see FIG. 1).

The two pairs of leveling displacement mechanisms 50 are respectively disposed in directions where the Lx adjustment knob 15 and the Ly adjustment knob 16 are disposed with respect to the rotation center axis C (see FIG. 1).

The two pairs of centering displacement mechanisms 40 each include a fixation portion 41 fixed to the upper surface of the movable base 31 and a feed screw shaft 42 rotatably supported by the fixation portion 41 via a bearing. The feed screw shaft 42 extends toward the rotation center axis C. A moving portion 43 is provided to the fixation portion 41 in a manner movable along the feed screw shaft 42. The feed screw shaft 42 is screwed in a nut portion of the moving portion 43. The moving portion 43 is partially opposed to a peripheral surface of the centering shaft 221 and is in contact with the peripheral surface of the centering shaft 221 through a rolling ball 44 held by a retainer. It should be noted that the moving portion 43 is biased in a direction toward the centering shaft 221 by an elastic member (not shown).

The feed screw shaft 42 of one of the two pairs of centering displacement mechanisms 40 is connected to the Cx adjustment knob 13 (see FIG. 3) and the feed screw shaft 42 of the other one is connected to the Cy adjustment knob 14 (see FIG. 4).

Thus, by operating the Cx adjustment knob 13, it is possible to relatively displace the moving portion 43 and the fixation portion 41 of the centering displacement mechanism 40 connected to the Cx adjustment knob 13 to displace the movable base 31 in a Cx direction with respect to the rotary base 21.

Moreover, by operating the Cy adjustment knob 14, it is possible to relatively displace the moving portion 43 and the fixation portion 41 of the centering displacement mechanism 40 connected to the Cy adjustment knob 14 to displace the movable base 31 in a Cy direction with respect to the rotary base 21.

In the exemplary embodiment, the centering shaft 221 extending from the rotary base 21 (the driving shaft 22 fixed thereto) and the two pairs of centering displacement mechanisms 40 (including the Cx adjustment knob 13 and the Cy adjustment knob 14), which are in contact with the centering shaft 221, provide a centering adjustment mechanism 92 in the Cx direction and the Cy direction.

The two pairs of leveling displacement mechanisms 50 each include a fixation portion 51, a feed screw shaft 52, a moving portion 53, and a rolling ball 54, which are respectively similar to the above fixation portion 41, feed screw shaft 42, moving portion 43, and rolling ball 44 of each of the centering displacement mechanisms 40. The rolling ball 54 is in contact with a peripheral surface of the leveling shaft 112. It should be noted that the moving portion 53 is biased in a direction toward the leveling shaft 112 by an elastic member (not shown).

The feed screw shaft 52 of one of the two pairs of leveling displacement mechanisms 50 is connected to the Lx adjustment knob 15 (see FIG. 3) and the feed screw shaft 52 of the other one is connected to the Ly adjustment knob 16 (see FIG. 4).

Thus, by operating the Lx adjustment knob 15, it is possible to relatively displace the moving portion 53 and the fixation portion 51 of the leveling displacement mechanism 50 connected to the Lx adjustment knob 15, causing the stage 11 to rotate along the slide surfaces 111 and 341 via the leveling shaft 112 to be inclined in the Lx direction.

Moreover, by operating the Ly adjustment knob 16, it is possible to relatively displace the moving portion 53 and the fixation portion 51 of the leveling displacement mechanism 50 connected to the Ly adjustment knob 16, causing the stage 11 to rotate along the slide surfaces 111 and 341 via the leveling shaft 112 to be inclined in the Ly direction.

In the exemplary embodiment, the leveling shaft 112 extending from the stage 11 and the two pairs of leveling displacement mechanisms 50 (including the Lx adjustment knob 15 and the Ly adjustment knob 16), which are in contact with the leveling shaft 112, provide a leveling adjustment mechanism 93 in the Lx direction and the Ly direction.

An outer periphery of the rotary base 21 is provided with a pair of first connecting mechanisms 61 at respective two diametrically opposite positions (see FIG. 2 and FIG. 3) and a ring-shaped (annular) transfer member 63 is supported between the pair of first connecting mechanisms 61.

The transfer member 63 is provided with second connecting mechanisms 62 at respective two positions orthogonally opposite to the pair of first connecting mechanisms 61. The second connecting mechanisms 62 are each connected to the lower surface of the stage 11.

Figure 5:
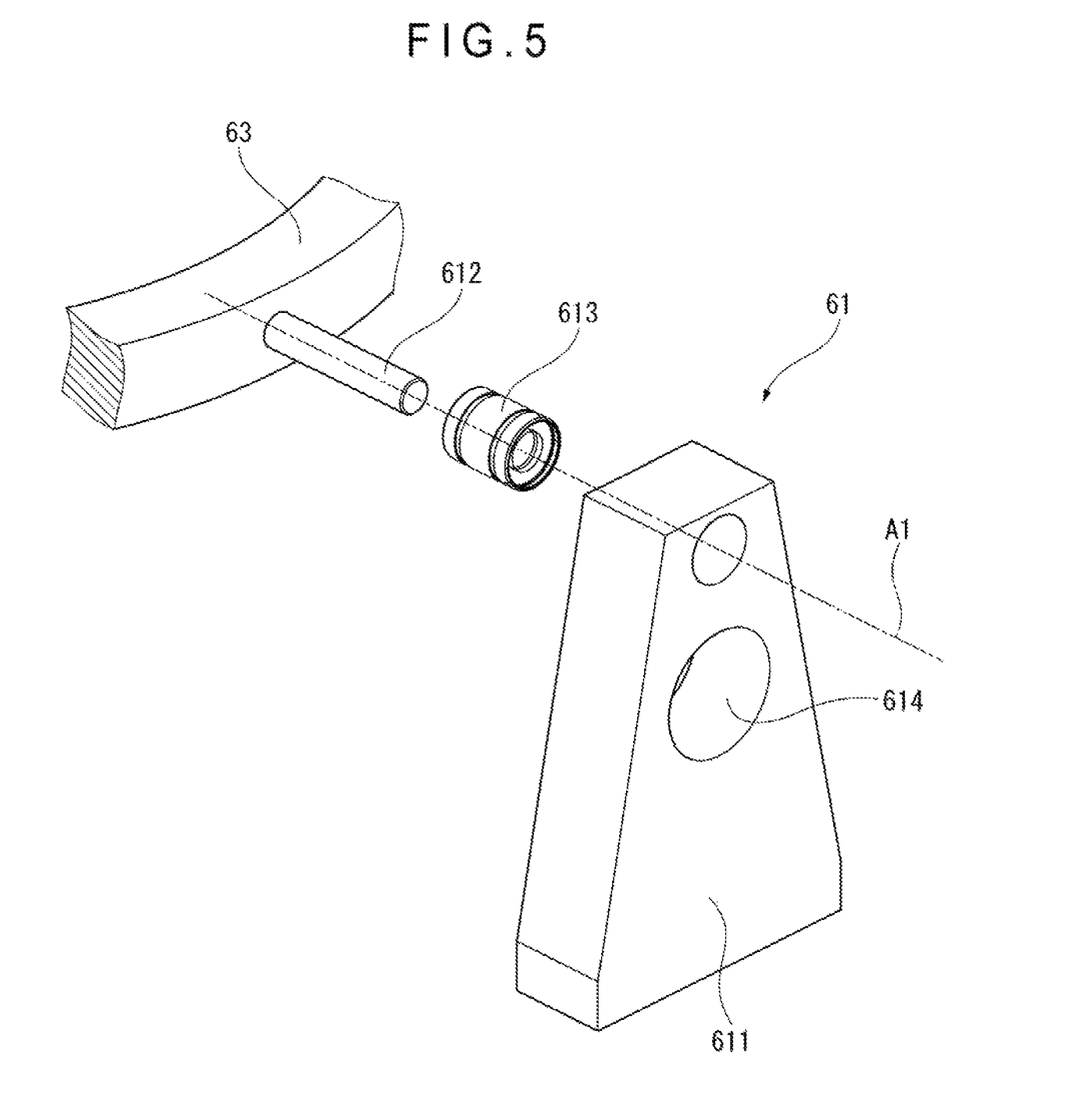
FIG. 5 is an exploded perspective view showing a first connecting mechanism according to the exemplary embodiment.

In FIG. 5, the first connecting mechanisms 61 each include a first block 611 fixed to the outer periphery of the rotary base 21 and a first shaft 612 fixed to the transfer member 63. A stroke bearing 613 is fitted in an upper end portion of the first block 611 and the first shaft 612 is inserted in the stroke bearing 613.

As shown in FIG. 2 and FIG. 3, the first shaft 612 is disposed along a first axis A1, allowing the rotary base 21 and the first block 611 and the first shaft 612 and the transfer member 63 to relatively rotate around the first axis A1. Moreover, since the first shaft 612 is received in the first block 611 through the stroke bearing 613, the rotary base 21 and the transfer member 63 are relatively displaceable in a direction of the first axis A1.

As shown in FIG. 5 and FIG. 3, the first block 611 is provided with an insertion hole 614 at a middle portion thereof. The Cx adjustment knob 13 and the Cy adjustment knob 14 of the centering adjustment mechanism 92 are able to be inserted into the respective insertion holes 614 to prevent mutual interference.

Figure 6:
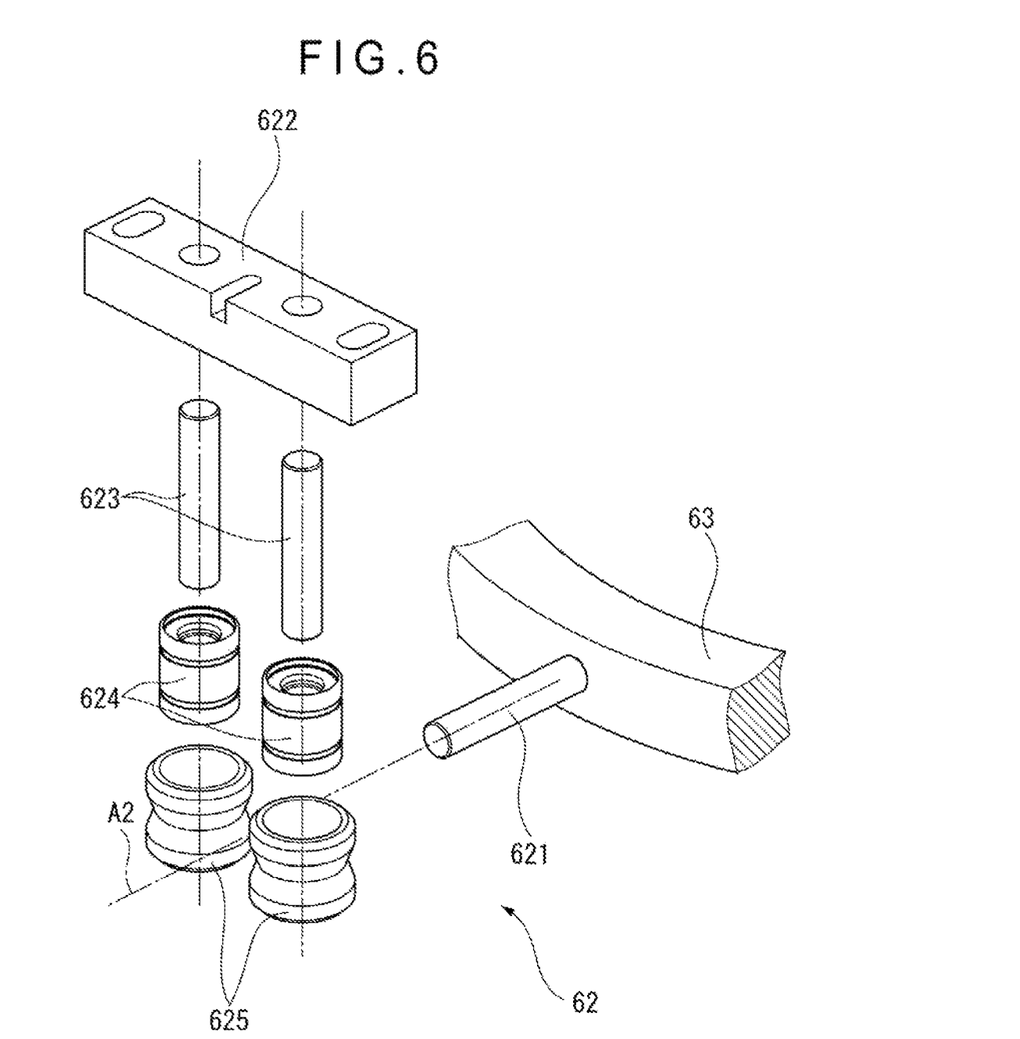
FIG. 6 is an exploded perspective view showing a second connecting mechanism according to the exemplary embodiment.

In FIG. 6, the second connecting mechanisms 62 each include a second shaft 621 fixed to an outer periphery of the transfer member 63 and a second block 622 fixed to the lower surface of the stage 11. A pair of pins 623 extending in the direction of the rotation center axis C (Z-axis direction) are fixed to a lower surface of the second block 622. A roller 625 is rotatably supported on each of the pins 623 via a stroke bearing 624. The pair of rollers 625 are each cylindrical and configured to hold the second shaft 621 inside respective grooves at middle portions of outer peripheral surfaces of the rollers 625.

As shown in FIG. 2 and FIG. 4, the second shaft 621 is disposed along a second axis A2. The second axis A2 is defined in a direction orthogonal to the first axis A1 of the first connecting mechanisms 61.

The transfer member 63 and the second shaft 621 and the second block 622 and the stage 11 are relatively rotatable around the second axis A2, while being relatively displaceable in a direction of the second axis A2 as a result of rolling of the rollers 625 on the second shaft 621.

In addition, the stroke bearing 624 is interposed between each of the pins 623 and the corresponding roller 625, allowing the rotary base 21 and the transfer member 63 to be relatively moved in a direction of the pins 623 (the direction of the rotation center axis C, i.e., Z-axis direction).

In the exemplary embodiment, the first connecting mechanisms 61, the second connecting mechanisms 62, and the transfer member 63 provide a transfer mechanism 94 according to the invention.

The transfer mechanism 94 is restricted from rotating around the rotation center axis C at each of the first connecting mechanisms 61 and the second connecting mechanisms 62. The transfer mechanism 94 enables to thus transfer a rotative force of the rotary base 21 to the stage 11.

The above support mechanism 91, which includes the rolling balls 32 and 35 in the middle, cannot sufficiently transfer a rotative force from the driving shaft 22 to the stage 11. However, in the exemplary embodiment, the transfer mechanism 94 can reliably transfer the rotative force of the rotary base 21 to the stage 11.

Moreover, since the first connecting mechanisms 61 and the second connecting mechanisms 62 are each disposed to oppose each other in a diametral direction of the transfer member 63, rotative forces transferred thereto become a couple of forces symmetric with respect to the rotation center axis C, allowing for prevention of unevenness of the rotative force even during acceleration or deceleration, for instance.

Meanwhile, the transfer mechanism 94 is rotatable around the first axis A1 and movable along the first axis A1 by the first connecting mechanisms 61, rotatable around the second axis A2 and movable along the second axis A2 orthogonal to the first axis A1 by the second connecting mechanisms 62, and, further, movable along the rotation center axis C orthogonal to each of the first axis A1 and the second axis A2.

Thus, in a case where the leveling adjustment mechanism 93 inclines the stage 11 in the Lx direction and the Ly direction with respect to the rotary base 21, this action is not interrupted.

In addition, in a case where the centering adjustment mechanism 92 displaces the stage 11 in the Cx direction and the Cy direction with respect to the rotary base 21, this action is not interrupted.

The exemplary embodiment described above can achieve the following effects.

In the exemplary embodiment, the support mechanism 91 enables support of the stage 11 on the rotary base 21, the leveling adjustment mechanism 93 enables leveling adjustment of the stage 11 with respect to the rotary base 21, and the transfer mechanism 94 enables transfer of the rotative force of the rotary base 21 to the stage 11.

Here, since the transfer mechanism 94 is functionally separated from the leveling adjustment mechanism 93 to be structurally unbound by the leveling adjustment mechanism 93, the first connecting mechanisms 61 and the second connecting mechanisms 62 can be mutually equidistantly provided to the annular transfer member 63 and be disposed symmetrically with respect to the rotation center axis C of the rotary table 10. As a result, the rotative forces transferred from the rotary base 21 to the stage 11 through the first connecting mechanisms 61 and the second connecting mechanisms 62 can be symmetrical with respect to the rotation center axis C, making it possible to achieve the leveling adjustment and prevent unevenness of the rotative forces.

Moreover, in the exemplary embodiment, since the transfer mechanism 94 includes the annular transfer member 63, the support mechanism 91 is insertable in the annular transfer member 63. Accordingly, even when the transfer mechanism 94 is separated from the support mechanism 91 or the leveling adjustment mechanism 93, the transfer mechanism 94 reliably functions as the rotary table 10.

Moreover, in the exemplary embodiment, the movable base 31, the support mechanism 91, and the stage 11 are horizontally displaceable with respect to the rotary base 21 and the displacement is adjustable by the centering adjustment mechanism 92. In the transfer mechanism 94, the first connecting mechanisms 61 are displaceable along the first axis A1 and the second connecting mechanisms 62 are displaceable along the second axis A2, thereby allowing horizontal displacement of the rotary base 21 and the stage 11. This makes it possible to obtain a centering adjustment function by the centering adjustment mechanism 92 in addition to the above leveling adjustment function by the leveling adjustment mechanism 93.

In the exemplary embodiment, the leveling shaft 112 and the centering shaft 221, which have the same diameter, are disposed coaxially with the rotation center axis C while respective end surfaces face each other. That is, the leveling shaft 112 is at the upper side and the centering shaft 221 is at the lower side with reference to the pair of facing end surfaces. The four displacement mechanisms 40 and 50 in total with the same configuration are disposed around the rotation center axis C at 90-degree intervals and adjacent two of the displacement mechanisms 40 and 50 are in contact with the leveling shaft 112 at the upper side while the remaining two of the displacement mechanisms 40 and 50 are in contact with the centering shaft 221 at the lower side, thereby defining the leveling adjustment mechanism 93 and the centering adjustment mechanism 92. Consequently, standardization and structural simplification of components are promotable.

It should be noted that the invention is not limited to the above exemplary embodiment but may include modifications, etc. as long as an object of the invention is achievable.

In the above exemplary embodiment, regarding the first connecting mechanisms 61, the stroke bearing 613 is fitted in the first block 611 and the first shaft 612 is fixed to the transfer member 63. Alternatively, the first shaft 612 may be fixed to the first block 611 and the stroke bearing 613 may be fitted in the transfer member 63 to achieve the same effect.

In the above exemplary embodiment, regarding the second connecting mechanisms 62, the second block 622 is provided with the pair of pins 623 and the rollers 625 to hold the second shaft 621 fixed to the transfer member 63. Alternatively, the transfer member 63 may be provided with the pair of pins 623 and the rollers 625 to hold the second shaft 621 fixed (in a direction of the second axis A2) to the second block 622.

In the above exemplary embodiment, the first connecting mechanisms 61, which connect the rotary base 21 and the transfer member 63, each include the first block 611, the first shaft 612, and the stroke bearing 613, thus being rotatable around the first axis A1 and movable along the first axis A1 (not movable along the rotation center axis C). Alternatively, the rotary base 21 may be provided with the pair of pins 623 and the rollers 625 as in the second connecting mechanisms 62 to hold the second shaft 621 fixed to the transfer member 63, thus being movable along the rotation center axis C.

In a case where the first connecting mechanisms 61 are movable along the rotation center axis C, the second connecting mechanisms 62 are not necessarily movable along the rotation center axis C. Specifically, the second connecting mechanisms 62 may each include the first block 611, the first shaft 612, and the stroke bearing 613, thus being rotatable around the second axis A2 and movable along the second axis A2 (not movable along the rotation center axis C).

In the above exemplary embodiment, the leveling shaft 112 and the centering shaft 221 are the same in diameter but may be different in diameter. The leveling displacement mechanisms 50 and the centering displacement mechanisms 40 may be disposed at different levels instead of being disposed at the same level. For instance, the leveling displacement mechanisms 50 may be disposed at a level of a lower end of the leveling shaft 112 and the centering displacement mechanisms 40 may be disposed at a level of an upper end of the centering shaft 221.

In addition, other components of the roundness measuring machine 1, such as the body case 2, a built-in drive motor, etc., the column 3, the probe 4, the motion mechanism 5, and the measurement controller 6, may be configured as appropriate in implementation.

What is claimed is:

1. A rotary table comprising:
    a stage on which a workpiece is to be placed;
    a rotary base configured to be rotated around a vertical rotation center axis;
    a support mechanism that is disposed on the rotary base and supports the stage;
    a leveling adjustment mechanism configured to perform a leveling adjustment of the stage with respect to the rotary base; and
    a transfer mechanism configured to transfer a rotative force of the rotary base to the stage, wherein
    the support mechanism comprises a support member that is supported by the rotary base and supports a lower side of the stage at a spherical slide surface,
    the leveling adjustment mechanism comprises:
        a leveling shaft that extends downward from a middle of the stage; and
        two pairs of leveling displacement mechanisms that are in contact with the leveling shaft, and
    the transfer mechanism comprises:
        an annular transfer member configured to receive the support mechanism therethrough;
        a first connecting mechanism that connects the transfer member and the rotary base and is rotatable around a first axis; and
        a second connecting mechanism that connects the transfer member and the stage and is rotatable around a second axis, the first axis and the second axis being defined in intersecting directions.

2. The rotary table according to claim 1, further comprising:
    a movable base displaceable along an upper surface of the rotary base; and
    a centering adjustment mechanism configured to perform a centering adjustment of the movable base with respect to the rotary base, wherein
    the support member and the leveling displacement mechanisms are supported by the movable base,
    the centering adjustment mechanism comprises:
        a centering shaft extending upward from a middle of the rotary base; and
        two pairs of centering displacement mechanisms that are in contact with the centering shaft,
    the first connecting mechanism comprises a portion connected to the transfer member and a portion connected to the rotary base, the portions being displaceable along the first axis, and
    the second connecting mechanism comprises a portion connected to the transfer member and a portion connected to the stage, the portions being displaceable along the second axis.

3. The rotary table according to claim 2, wherein
    the leveling shaft and the centering shaft are each disposed coaxially with the rotation center axis and have respective end surfaces disposed to face each other.

4. The rotary table according to claim 1, wherein
    the first connecting mechanism comprises:
        a stroke bearing disposed at one of a portion connected to the transfer member and a portion connected to the rotary base; and
        a shaft disposed at the other one of the portion connected to the transfer member and the portion connected to the rotary base, the shaft being received in the stroke bearing.

5. The rotary table according to claim 1, wherein
    the first connecting mechanism comprises:
        a pair of pins that are disposed at one of a portion connected to the transfer member and a portion connected to the rotary base and extend in a direction of the rotation center axis;
        a pair of rollers each supported on corresponding one of the pins via a stroke bearing while being rotatable and movable in the direction of the rotation center axis; and
        a shaft disposed at the other one of the portion connected to the transfer member and the portion connected to the rotary base and held between the pair of rollers while being longitudinally movable.

6. The rotary table according to claim 1, wherein
    the second connecting mechanism comprises:
        a stroke bearing disposed at one of a portion connected to the transfer member and a portion connected to the stage; and
        a shaft disposed at the other one of the portion connected to the transfer member and the portion connected to the stage, the shaft being received in the stroke bearing.

7. The rotary table according to claim 1, wherein
    the second connecting mechanism comprises:
        a pair of pins that are disposed at one of a portion connected to the transfer member and a portion connected to the stage and extend in a direction of the rotation center axis;
        a pair of rollers each supported on corresponding one of the pins via a stroke bearing while being rotatable and movable in the direction of the rotation center axis; and
        a shaft disposed at the other one of the portion connected to the transfer member and the portion connected to the stage and held between the pair of rollers while being longitudinally movable.

8. A roundness measuring machine comprising the rotary table according to claim 1.

* * * * *